US012709226B2

(12) United States Patent
Fitzsimons et al.

(10) Patent No.: US 12,709,226 B2

(45) **Date of Patent: *Aug. 18, 2026**

(54) COMMAND CENTER STORAGE SYSTEM

(71) Applicant: GIGUNDA GROUP, LLC, Portsmouth, NH (US)

(72) Inventors: Ryan M. Fitzsimons, Rye, NH (US); James H. Beer, Portsmouth, NH (US)

(73) Assignee: GIGUNDA GROUP, LLC, Portsmouth, NH (US)

(*) Notice: Subject to any disclaimer, the term of this patent is extended or adjusted under 35 U.S.C. 154(b) by 87 days.

This patent is subject to a terminal disclaimer.

(21) Appl. No.: 18/104,623

(22) Filed: Feb. 1, 2023

(65) Prior Publication Data

US 2023/0173989 A1 Jun. 8, 2023

Related U.S. Application Data

(63) Continuation of application No. 17/089,682, filed on Nov. 4, 2020, now Pat. No. 11,584,303.

(60) Provisional application No. 62/930,850, filed on Nov. 5, 2019.

(51) Int. Cl.
*B60R 7/02* (2006.01)
*B60R 9/06* (2006.01)

(52) U.S. Cl.
CPC ................ *B60R 7/02* (2013.01); *B60R 9/065* (2013.01)

(58) Field of Classification Search
CPC .. B60R 7/02; B60R 5/04; B60R 9/065; B25H 3/022; B25H 3/023; B25H 3/026; B25H 3/027; B25H 3/028
USPC .................................................. 224/403–404
See application file for complete search history.

(56) References Cited

U.S. PATENT DOCUMENTS 4,643,494 A * 2/1987 Marleau ................... A45C 5/00 292/120
4,733,898 A * 3/1988 Williams ............... B62D 33/02 296/24.32
5,052,739 A * 10/1991 Irwin ...................... B60R 11/00 296/65.03

(Continued)

OTHER PUBLICATIONS

The Container Store Website, https://www.containerstore.com/s/office/message-boards-accessories/three-by-three-large-stainless-steel-magnetic-dry-erase-board/12d?productId=10033143, last visited in 2017 via archive.org. (Year: 2017).*

(Continued)

*Primary Examiner* — Scott T McNurlen
(74) *Attorney, Agent, or Firm* — Secant IP, PLLC

(57) ABSTRACT

A command center storage system includes a stationary unit and a moveable unit. The stationary unit comprises a support platform and a lower storage cavity disposed at least partially below the support platform. The support platform has an upper and lower surface and a forward and rearward region. The lower surface is adjacent to a loading floor of a vehicle and the rearward region includes an opening to the lower storage chamber. The moveable unit moves between a rear position and a forward position relative to the stationary unit, and extends over a portion of the rearward region of the support platform and the opening to the lower storage chamber when the moveable unit is in the rear position. The moveable unit extends over a portion of the forward region of the support platform such that the opening to the lower storage chamber is accessible when the moveable unit is in the forward position.

20 Claims, 9 Drawing Sheets

(56) References Cited

U.S. PATENT DOCUMENTS

| | | | | |
|---|---|---|---|---|
| 7,097,224 | B2 * | 8/2006 | Lester | B60R 9/00<br>224/404 |
| 7,159,917 | B2 * | 1/2007 | Haaberg | B60P 1/003<br>224/403 |
| 2005/0110294 | A1 * | 5/2005 | Grafton | B60R 9/00<br>296/37.1 |
| 2005/0146151 | A1 * | 7/2005 | Walker | B60R 9/00<br>296/37.6 |
| 2006/0102669 | A1 * | 5/2006 | Fouts | B60R 9/00<br>224/404 |
| 2014/0251368 | A1 * | 9/2014 | Lawson | A45C 13/02<br>206/37 |
| 2015/0102624 | A1 * | 4/2015 | Kmita | B62D 33/04<br>296/37.6 |
| 2016/0167591 | A1 * | 6/2016 | Salinas | B60R 9/06<br>224/404 |
| 2017/0232907 | A1 * | 8/2017 | Singer | B60P 1/6427<br>224/404 |

OTHER PUBLICATIONS

Strictly Tool Boxes Website, http://www.strictlytoolboxes.com/tool-vault-72-tool-box-hutch.html, last visited 2017 via archive.org. (Year: 2017).*

* cited by examiner

58

COMMAND CENTER STORAGE SYSTEM

CROSS REFERENCE TO RELATED APPLICATIONS

The present application is continuation of U.S. application Ser. No. 17/089,682, filed Nov. 4, 2020, which claims the benefit of U.S. Provisional Patent Application Ser. No. 62/930,850 filed Nov. 5, 2019, both of which are fully incorporated herein by reference.

TECHNICAL FIELD

This application relates to a storage assembly, and more particularly, to command and storage center for organizing and storing equipment in emergency situations.

BACKGROUND INFORMATION

The following is not an admission that anything discussed below is part of the prior art or part of the common general knowledge of a person skilled in the art.

Emergency personal generally have a lot of equipment which must be transported in a vehicle. When travelling in a vehicle, the equipment should be properly stowed such that it cannot move. In addition, the equipment should be stored in a manner that minimizes exposure to occupants of harmful chemicals which the equipment may have been exposed to during an emergency. Moreover, the equipment should be easily and quickly assessable to the emergency personal once on location.

Many vehicles have a limited cargo storage space, and the space is often set up as one large, open space. As a result, it can be difficult to secure the equipment within the cargo space such that it does not move. Moreover, it is often necessary to pile some of the equipment on top of other equipment due to the limited about of surface area within the cargo area. This can not only cause damage to the equipment and may be a safety problem to the passengers within the vehicle, but can also make finding a particular piece of equipment difficult. Moreover, many cargo areas (for example, hatches on SUVs or wagons) are visible from outside of the vehicle and/or are completely accessible/exposed when one or more of the doors of the vehicle are open. This results in a situation where equipment can be easily stolen.

BRIEF DESCRIPTION OF THE DRAWINGS

These and other features advantages will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
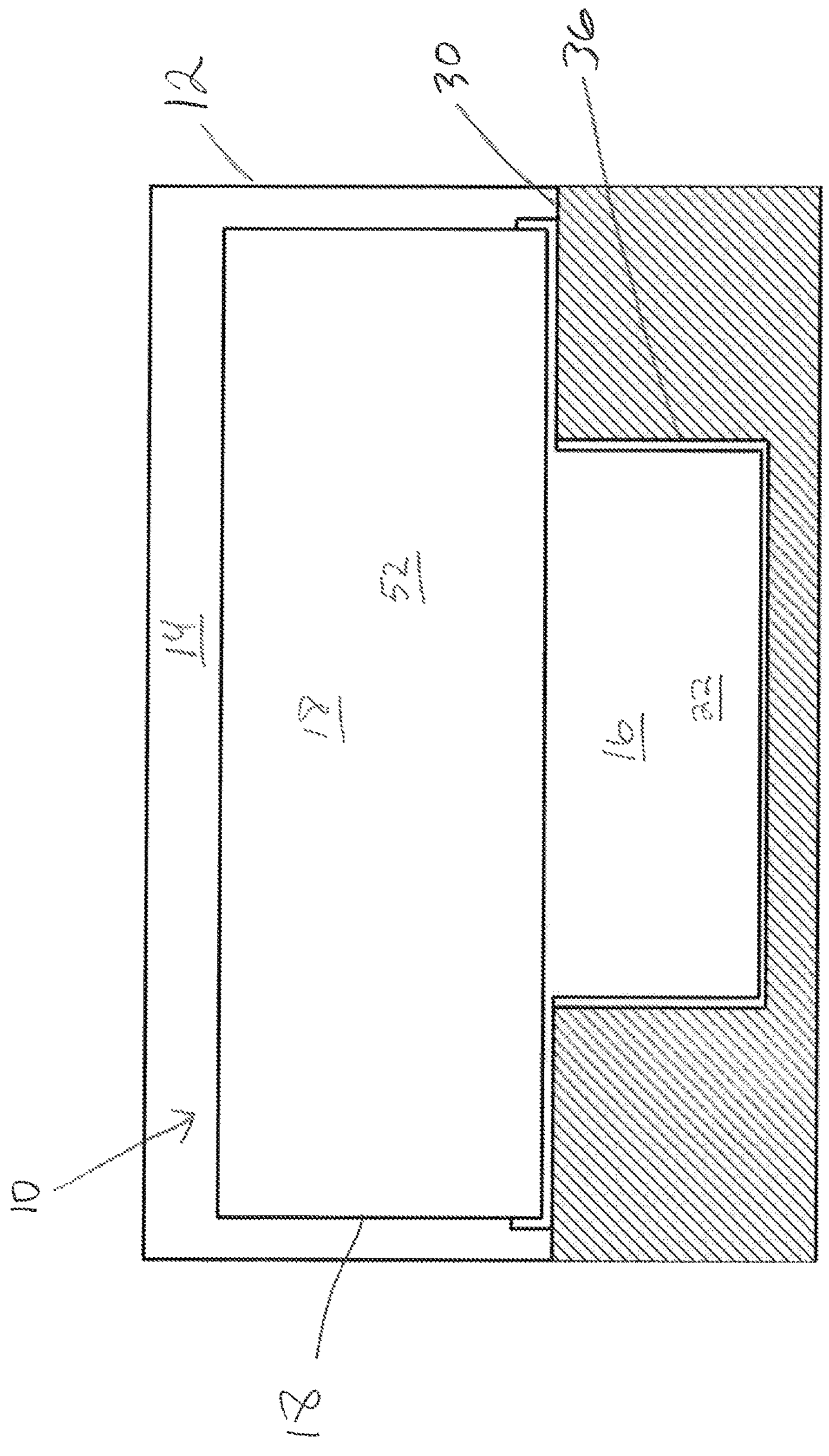
FIG. 1 is a schematic cross-sectional illustration of one example of a command center storage system installed in a vehicle, consistent with the present disclosure.

Referring to FIG. 1, a schematic cross-sectional illustration of one example of a command center storage system 10 installed in a vehicle 12 is generally illustrated. In the illustrated example, the command center storage system 10 is shown installed in a hatch/cargo area 14 of a sport utility vehicle or station wagon; however, it should be appreciated that the command center storage system 10 may be installed in any type of vehicle 12 (such as, but not limited to, cars (e.g., two or four door cars), support utility vehicles (SUVs), trucks, or the like) and anywhere in a vehicle 12 (such as, but not limited to, in the hatch/cargo area, rear seat area, the front seat area, and/or bed of a truck). As explained herein, the command center storage system 10 may be configured to quickly and easily store, secured, and/or organize equipment in the vehicle 12. While not a limitation of the present disclosure unless specifically claimed as such, the command center storage system 10 may be particularly suited for emergency personal such as, but not limited to, fire and rescue, paramedics, or the like.

Figure 2:
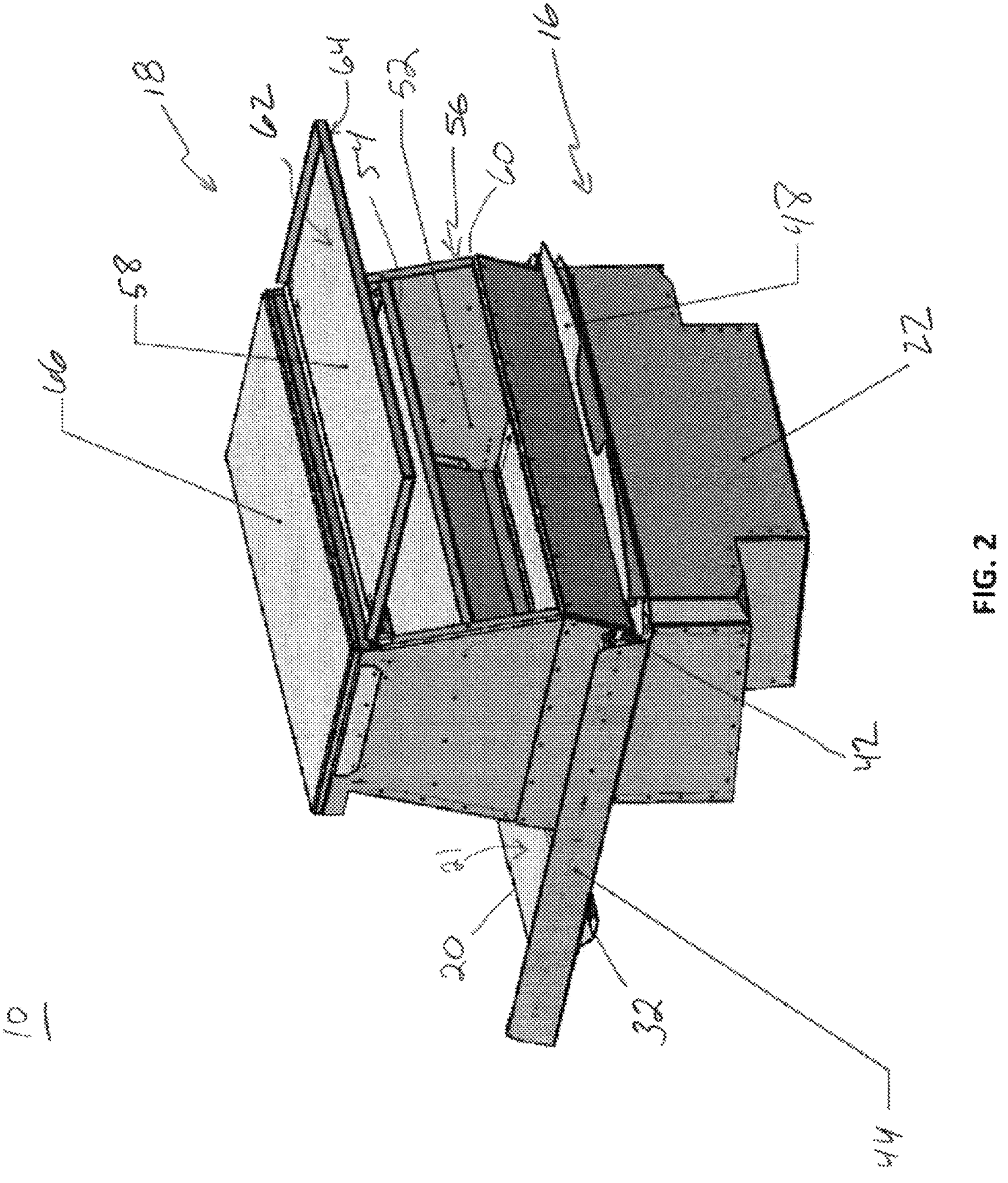
FIG. 2 is a rear perspective view of one example of the command center storage system of FIG. 1 in a rearward position, consistent with the present disclosure.
Figure 3:
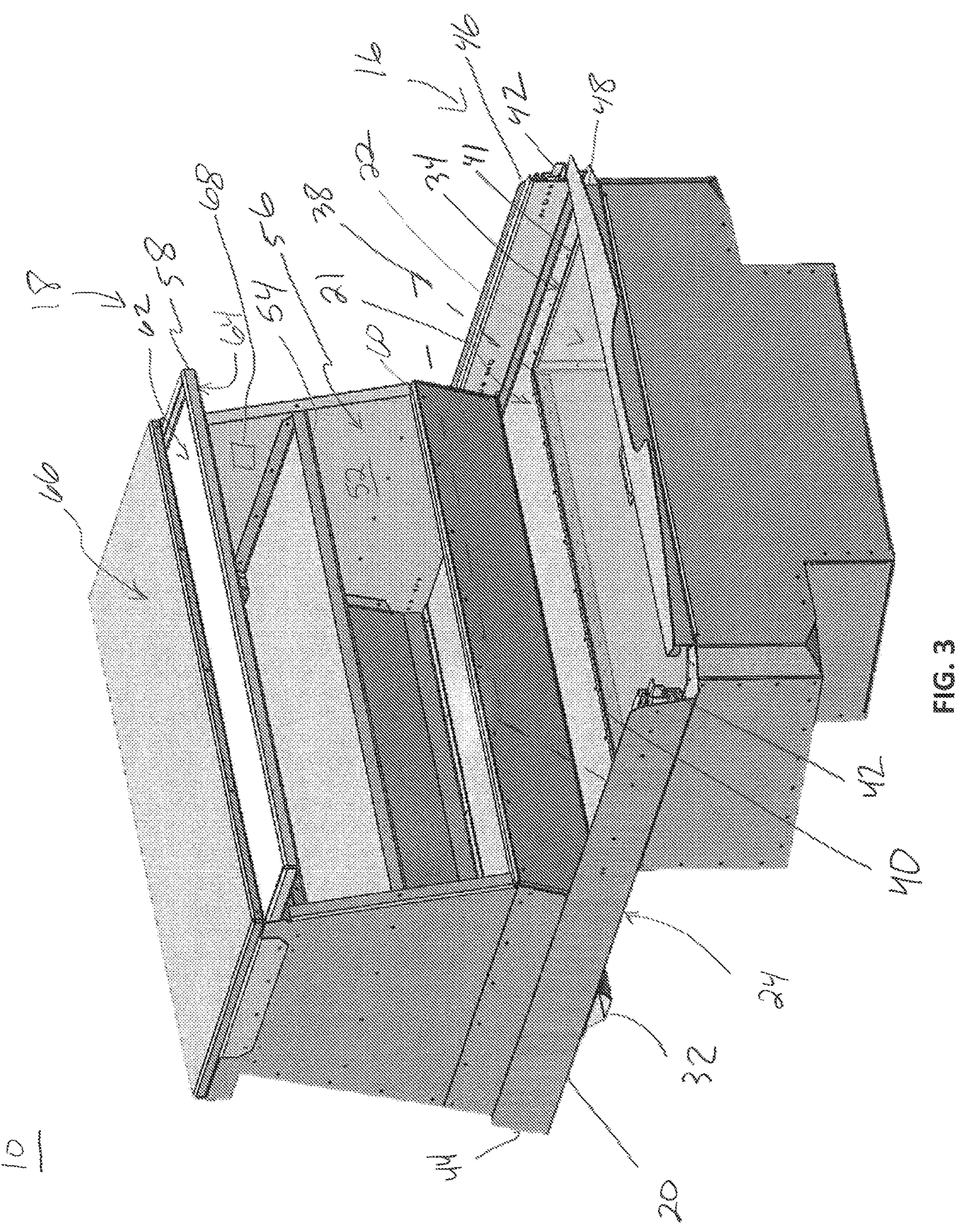
FIG. 3 is a rear perspective view of one example of the command center storage system of FIG. 1 in a forward position, consistent with the present disclosure.
Figure 4:
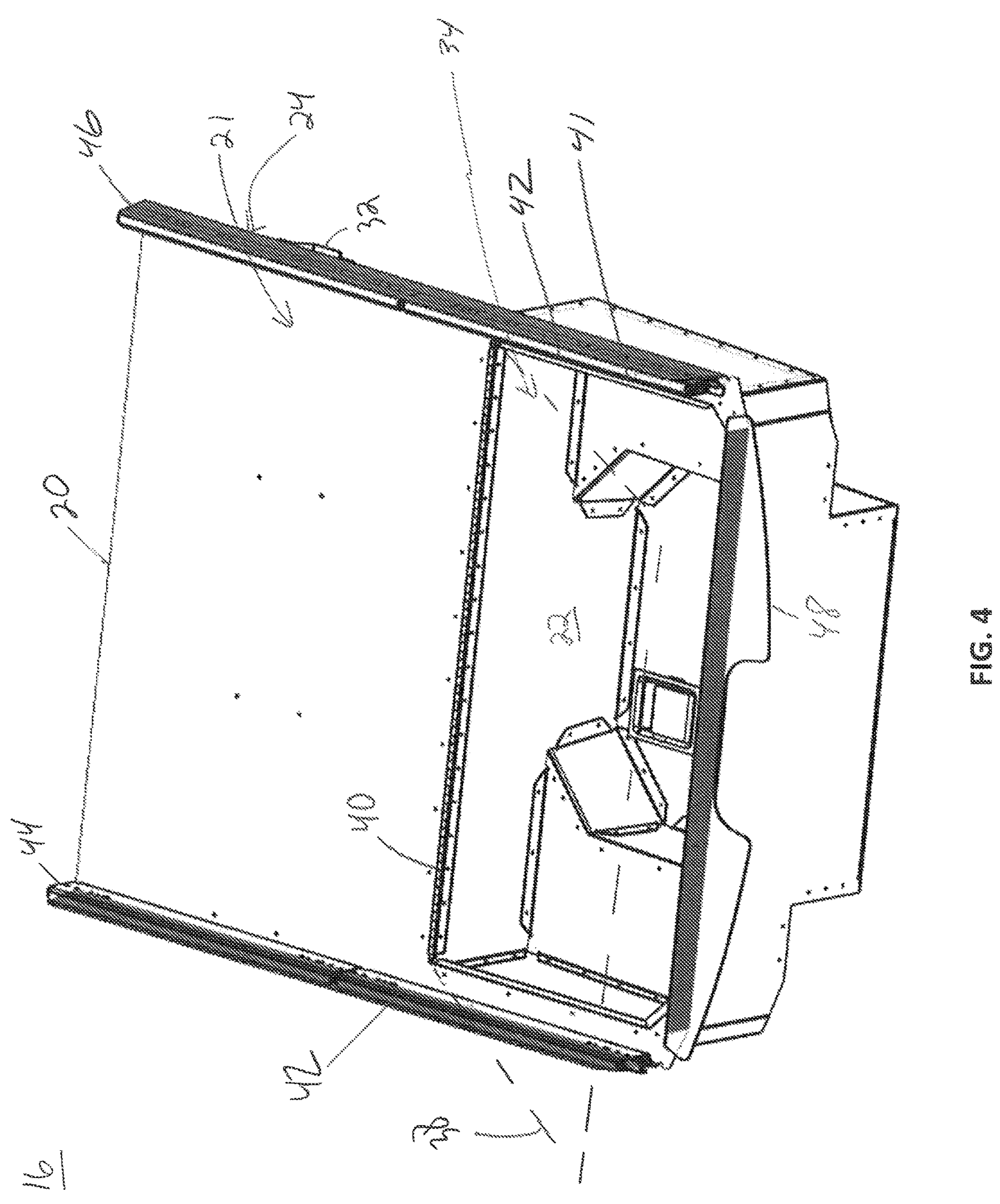
FIG. 4 is a rear perspective view of one example of the stationary unit of FIG. 1, consistent with the present disclosure.

The command center storage system 10 may include a stationary unit 16 and/or a moveable unit 18. With reference to FIGS. 1-3, the stationary unit 16 may be secured within the hatch/cargo area 14 of the vehicle, and the moveable unit 18 may be configured to move between a rear position (as generally illustrated in FIG. 2) and a forward position (as generally illustrated in FIG. 3) relative to the stationary unit 16. The stationary unit 16 includes a support platform 20 and a lower storage cavity 22 disposed at least partially below the support platform 20. While not a limitation of the present disclosure unless specifically claimed as such, the moveable unit 18 may be closer to a rear portion of the vehicle 12 than a front portion of the vehicle 12 when in the rear position (FIG. 2) and may be closer to the front portion of the vehicle 12 than the rear portion of the vehicle 12 when in the forward position (FIG. 3). Put another way, the moveable unit 18 may be closer to the rear portion of the vehicle 12 when in the rear position (FIG. 2) than when in the forward position (FIG. 3) and the moveable unit 18 may be closer to the front portion of the vehicle 12 when in the forward position (FIG. 3) than when in the rear position (FIG. 2).

Figure 5:
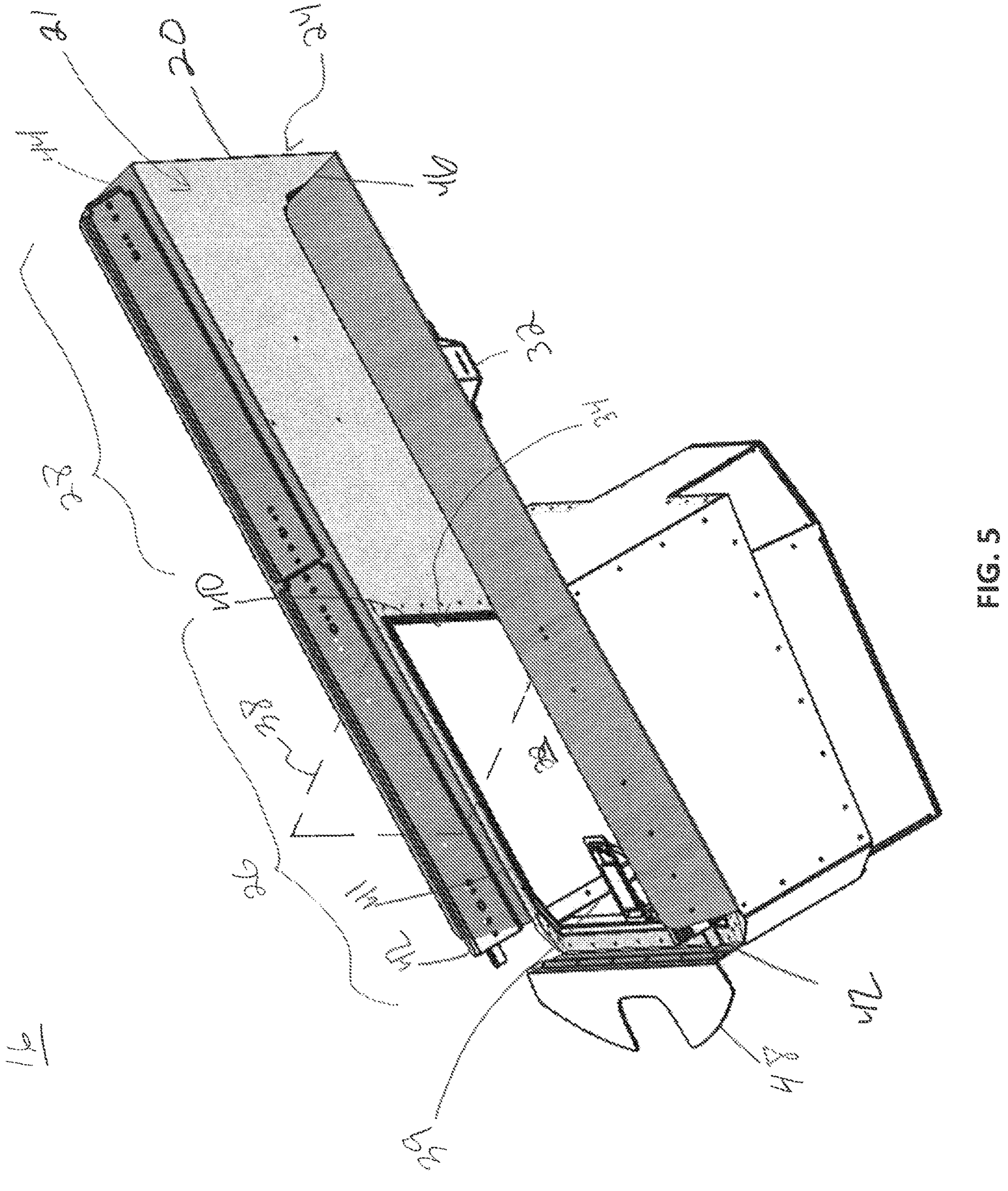
FIG. 5 is a side perspective view of the stationary unit of FIG. 4, consistent with the present disclosure.
Figure 6:
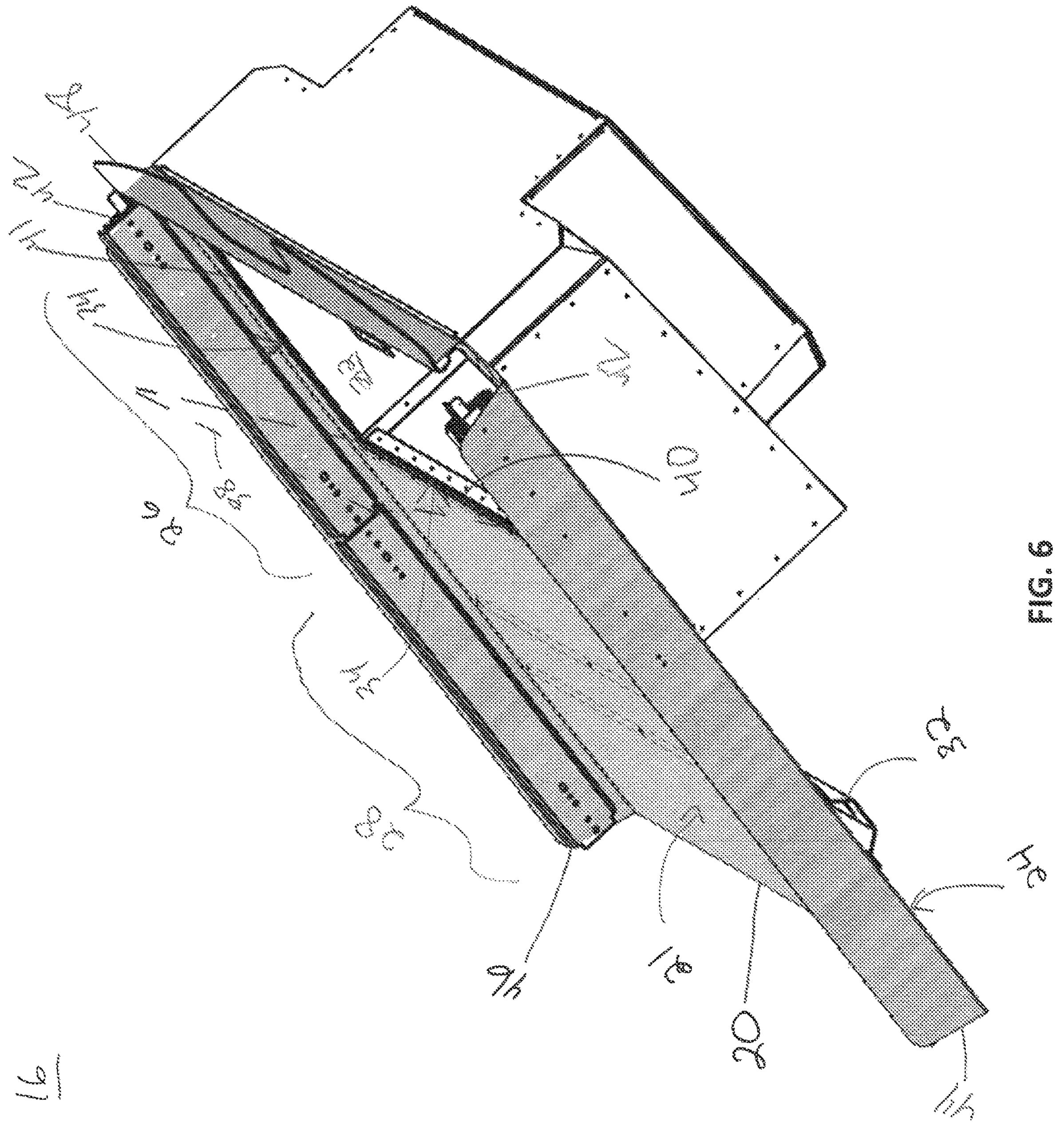
FIG. 6 is another side perspective view of the stationary unit of FIG. 4, consistent with the present disclosure.

With additional reference to FIGS. 5 and 6, the support platform 20 may include an upper surface 21, a lower surface 24, a rearward region 26, and a forward region 28. The upper surface 21 may optionally include a generally planar surface. The lower surface 24 may be configured to be adjacent to a loading floor 30 of the vehicle 12 (FIG. 1). In one example, the lower surface 24 may be configured to abut against the loading floor 30 of the vehicle 12. The lower surface 24 may include one or more support braces 32 or the like. The support braces 32 may increase the structural rigidity of the stationary unit 16 and/or may be used to secure the stationary unit 16 to the vehicle 12. The support platform 20 may be secured to the loading floor 30 of the vehicle 12 using one or more fasteners (bolts, screws, or the like, not shown for clarity), which may optionally extend through the support brace 32.

The rearward region 26 of the support platform 20 includes an opening 34 to the lower storage chamber 22. The lower storage chamber 22 may be configured to store and/or organize equipment and may include one or more sidewalls, bottom walls, top walls, and/or the like. The lower storage chamber 22 may optionally include one or more dividers, mounts, brackets, shelves, or the like (not shown for clarity) configured to organize equipment within the lower storage chamber 22. In at least one example, at least a portion of the lower storage chamber 22 may be configured to be at least partially received in a spare tire well 36 (FIG. 1) of the vehicle 12. For example, the spare tire (and any other equipment in the spare tire well 36) may be removed, and at least a portion of the lower storage chamber 22 may be secured within the spare tire well 36. The lower storage chamber 22 may have outer dimensions substantially corresponding to a spare tire well 36 (FIG. 1) of the vehicle 12. For example, the outer volume of the lower storage chamber 22 may be at least 75% of the volume of the spare tire well 36, at least 80% of the volume of the spare tire well 36, at least 85% of the volume of the spare tire well 36, at least 90% of the volume of the spare tire well 36, and/or at least 95% of the volume of the spare tire well 36, including all values and ranges therein. At least a portion of the lower storage chamber 22 may extend below the support platform 20 (e.g., below the upper and/or lower surfaces 21, 24 of the support platform 20). It should be appreciated that in at least one example, a portion of the lower storage chamber 22 may also extend above the spare tire well 36, e.g., above the loading floor 30 of the vehicle 12, and/or above the support platform 20 (e.g., above the upper and/or lower surfaces 21, 24 of the support platform 20).

The stationary unit 16 may optionally include one or more covers 38 (shown in broken lines in FIGS. 3-6) configured to extend across the opening 34 to the lower storage chamber 22. The cover 38 may be configured to selectively provide access to the lower storage chamber 22. The cover 38 may be coupled to the support platform 20 by way of one or more hinges 40 configured to allow the cover 38 to be selectively arranged in an open position (as shown in FIG. 3) in which the lower storage chamber 22 is accessible, and a closed position in which the lower storage chamber 22 is generally inaccessible. Alternatively, the cover 38 may be configured to be removed (e.g., disconnected) from the support platform 20. The cover 38 may optionally include one or more locks 39 configured to secure the cover 38 in the closed position (e.g., secure the cover 38 to the support platform 20).

The lower storage chamber 22 may be configured to generally sealed from the environment. As used herein, the term "generally sealed" is not limited to a hermetic seal, but rather is intended to mean that a seal is formed that is compatible with at least IP classification system protection level IP51 or greater or the like. In at least one example, one or more gaskets 41 may be configured to generally seal the lower storage chamber 22. For example, the gasket 41 may be configured to generally seal the cover 38 to the support platform 20. One or more gaskets 41 may be disposed on the cover 38 and/or the support platform 20. Alternatively (or in addition), the gasket 41 may be configured to generally seal the support platform 20 (e.g., the lower storage chamber 22) to the moveable unit 18. For example, one or more gaskets 41 may be disposed on the moveable unit 18 and/or the support platform 20. By way of non-limiting examples, the gasket 41 may include rubber gaskets, O-rings, foam gaskets, or the like. Sealing the lower storage chamber 22 from the environment may reduce exposure to potentially harmful chemicals that may be present on the equipment stored within the lower storage chamber 22. This may be particularly useful for emergency personal such as, but not limited to fire and rescue personal.

Figure 7:
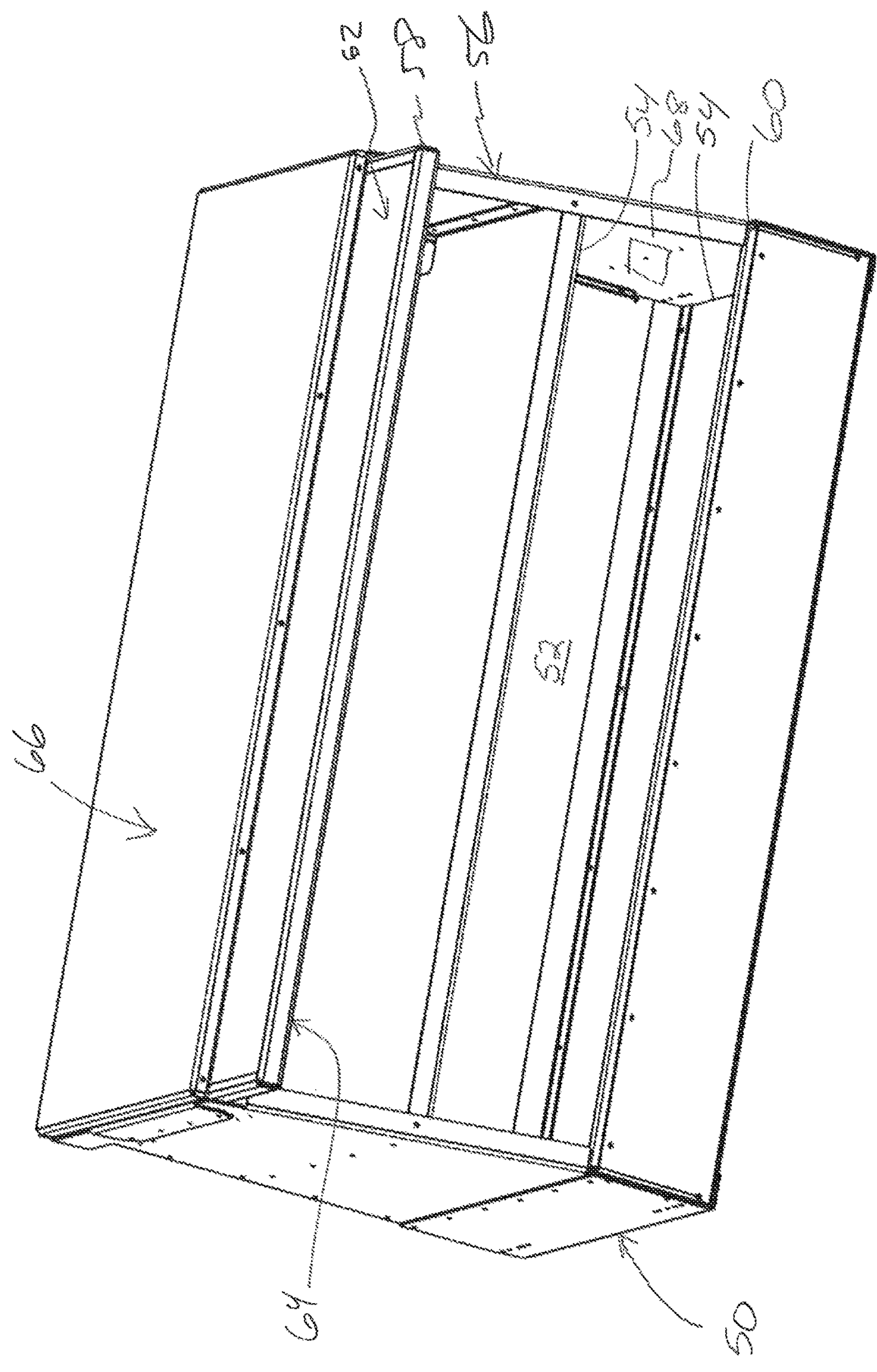
FIG. 7 is a rear perspective view of one example of the moveable unit of FIG. 1 with the door in an open position, consistent with the present disclosure.
Figure 8:
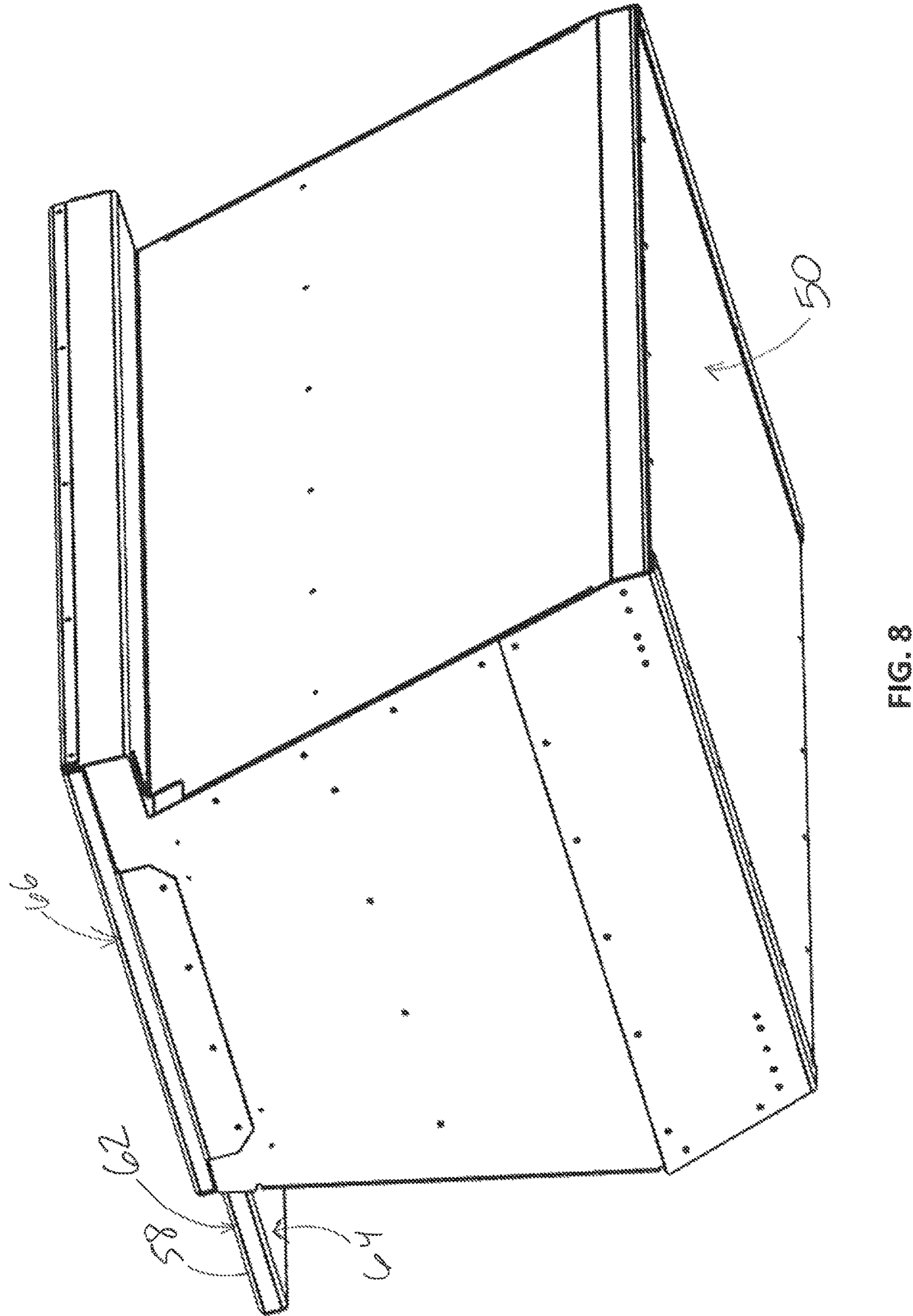
FIG. 8 is a front perspective view of the moveable unit of FIG. 7, consistent with the present disclosure.
Figure 9:
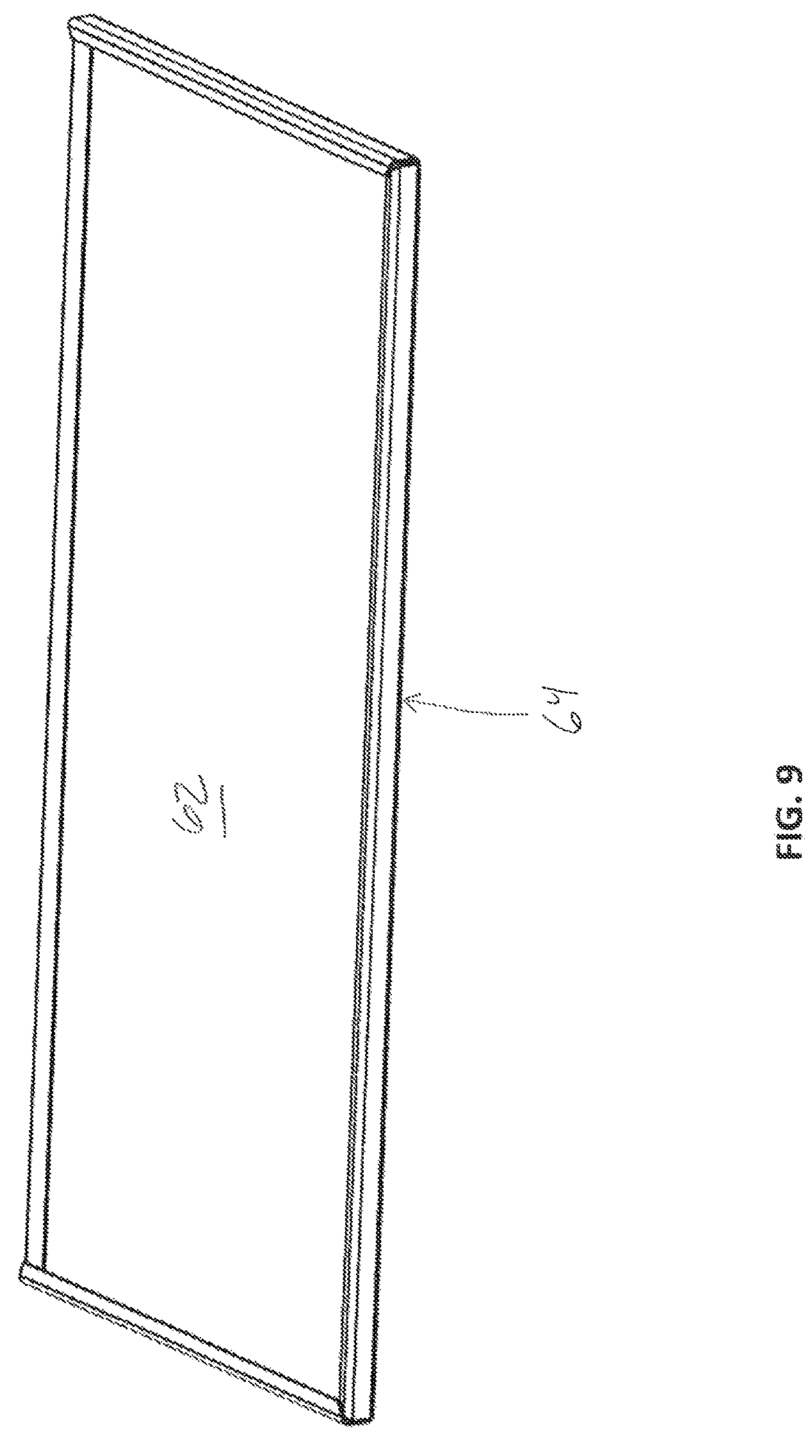
FIG. 9 generally illustrates one example of eth door of FIG. 7, consistent with the present disclosure.

With additional reference to FIGS. 7-9, the moveable unit 18 may be configured to move between a rear position (FIG. 2) and a forward position (FIG. 3) relative to the stationary unit 16. In at least one example, the command center storage system 10 may include at least one slide rail 42 configured to slidably couple the moveable unit 18 to the stationary unit 16. For example, the command center storage system 10 may include a first and a second slide rail 42 extending along a first and a second side rail 44, 46 of the stationary unit 16, respectively. The first and second slide rail 44, 46 may extend at least partially between the rearward region 26 and forward region 28. The first and second side rail 44, 46 may extend generally upwards from the support platform 20 (e.g., generally away from the lower storage chamber 22 and/or generally towards the moveable unit 18). The command center storage system 10 may optionally include one or more locks 48 configured to secure the moveable unit 16 in the rear position (FIG. 2) and/or configured to secure the moveable unit 16 in the forward position (FIG. 3). The lock 48 may be configured to generally prevent movement of the moveable unit 16 while the vehicle 12 is in motion.

The moveable unit 18 may be configured to at least partially extend over at least a portion of the rearward region 26 of the support platform 20 and the opening 34 to the lower storage chamber 22 when the moveable unit 18 is in the rearward position (FIG. 2). The moveable unit 18 may also be configured to move from the rearward position to the forward position (FIG. 3) such that at least a portion of the moveable unit 18 extends over at least a portion of the forward region 28 of the support platform 20 and the opening 34 to the lower storage chamber 22 is accessible to a user. In at least one example, the upper surface 22 of the rearward region 28 of the support platform 20 has a surface area equal to or greater than a bottom surface area of the moveable unit 18.

The moveable unit 18 may be configured to cover the opening 34 to the lower storage chamber 22 when in the rearward position (FIG. 2). For example, the moveable unit 18 may extend over at least a portion of the opening 34 to the lower storage chamber 22 when in the rearward position to generally prevent access to the lower storage chamber 22.

In at least one example, the bottom surface 50 of the moveable unit 18 may be disposed within 5 cm from the upper surface 21 when covering the opening 34 to the lower storage chamber 22.

The moveable unit 18 may define at least one upper storage chamber 52. The upper storage chamber 52 may be configured to store and/or organize equipment and may include one or more sidewalls, bottom walls, top walls, and/or the like. The upper storage chamber 52 may optionally include one or more dividers, mounts, brackets, shelves, or the like 54 configured to organize equipment within the upper storage chamber 52. The moveable unit 18 may include one or more openings 56 and optionally one or more doors 58 configured to alternately open and close access to the upper storage chamber 52 through the openings 56. A lock 60 may be provided to secure the doors 58 in the closed position to generally prevent access to the upper storage chamber 52. In at least one example, the lock 60, lock 39, and/or lock 48 may be configured to be simultaneously locked and/or unlocked. This may be particularly useful in that it may allow a user to simultaneously lock or unlock two or more of the locks 39, 48, 60, thereby minimizing the amount of time and/or minimizing the number of keys/passwords to get to the equipment. Optionally, the lower storage chamber 22 and the upper storage chamber 52 may be configured to be simultaneously accessible when the moveable unit 18 is in the rearward position (FIG. 3).

One or more surfaces of the door 58 may include a writeable surface (e.g., a dry erase surface). For example, at least a portion of the exterior surface 62 of the door 58 (i.e., the surface of the door 58 that is exposed to the environment when the door 58 to the upper storage chamber 52 is closed) may include a writeable surface. Alternatively (or in addition), at least a portion of the interior surface 64 of the door 58 (i.e., the surface of the door 58 that is exposed to the upper storage chamber 52 when the door 58 to the upper storage chamber 52 is closed) may include a writeable surface. The writeable surface may be particularly useful in an emergency situation.

The moveable unit 18 may optionally include an upper mounting surface 66 configured to mount equipment (not shown for clarity) thereon. The upper mounting surface 66 may include one or more mounts or brackets. The upper mounting surface 66 may be spaced apart from a top surface of the upper storage chamber 52 to provide a space for electrical wires or the like. The command center storage system 10 (e.g., the stationary unit 16 and/or the moveable unit 18) may also include one or more electrical connectors 68 configured to supply electricity to equipment mounted to the upper mounting surface 66 and/or disposed within the lower storage chamber 22 and/or upper storage chamber 52. In at least one example, the door 58 may be configured to pivot and slide at least partially underneath the upper mounting surface 66, for example, as generally illustrated in FIG. 3.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It will be appreciated by a person skilled in the art that a mobile conference workstation may embody any one or more of the features contained herein and that the features may be used in any particular combination or sub-combination. Modifications and substitutions by one of ordinary skill in the art are considered to be within the scope of the present invention, which is not to be limited except by the claims.

What is claimed is:

1. A command center storage system comprising:

a stationary unit, the stationary unit comprising a support platform and a lower storage cavity disposed at least partially below the support platform, the support platform having a planar upper surface, a lower surface, a forward region, and a rearward region, wherein the lower surface is configured to be adjacent to a loading floor of a vehicle and the rearward region of the planar upper surface includes an opening to the lower storage chamber;

a first and a second slide rail disposed on the planar upper surface of the support platform and extending at least partially between the rearward region and the forward region; and a moveable unit slidably coupled to the stationary unit via the first and second slide rails and configured to move between a rear position and a forward position relative to the stationary unit along a longitudinal axis extending between the forward region and the rearward region, wherein the moveable unit at least partially extends over at least a portion of the rearward region of the planar upper surface and the opening to the lower storage chamber when the moveable unit is in the rear position, and wherein the moveable unit extends over at least a portion of the forward region of the planar upper surface such that the opening to the lower storage chamber is accessible when the moveable unit is in the forward position, wherein the upper surface of the forward region of the support platform has a surface area equal to or greater than a bottom surface area of the moveable unit.

2. The command center storage system of claim 1, wherein the first and second side rail extend generally upwards from the support platform generally towards the moveable unit.

3. The command center storage system of claim 1, further comprising at least one lock configured to secure the moveable unit in the rear position.

4. The command center storage system of claim 1, further comprising at least one lock configured to secure the moveable unit in the forward position.

5. The command center storage system of claim 1, further comprising a cover configured to extend across the opening to the lower storage chamber.

6. The command center storage system of claim 5, further comprising at least one hinge coupling the cover to the support platform.

7. The command center storage system of claim 5, further comprising a gasket configured to generally seal the lower storage chamber.

8. The command center storage system of claim 7, wherein the gasket is configured to generally seal the cover to the support platform.

9. The command center storage system of claim 1, wherein the moveable unit is configured to cover the opening to the lower storage chamber.

10. The command center storage system of claim 9, further comprising a gasket configured to generally seal the lower storage chamber.

11. The command center storage system of claim 10, wherein the gasket is configured to generally seal the lower storage chamber to the moveable unit.

12. The command center storage system of claim 1, wherein the moveable unit defines at least one upper storage chamber.

13. The command center storage system of claim 12, wherein the moveable unit includes an opening and a door configured to alternately open and close access to the upper storage chamber.

14. The command center storage system of claim 13, wherein the door includes a dry erase surface.

15. The command center storage system of claim 14, wherein the moveable unit includes an upper mounting surface configured to mount equipment thereon, and wherein the door is configured to pivot and slide at least partially underneath the upper mounting surface.

16. The command center storage system of claim 1, wherein the lower storage chamber and the upper storage chamber are configured to be simultaneously accessible when the moveable unit is in the forward position.

17. A command center storage system comprising:

a stationary unit, the stationary unit comprising a support platform and a lower storage cavity disposed at least partially below the support platform, the support platform having a planar upper surface, a lower surface, a forward region, and a rearward region, wherein the lower surface is configured to be adjacent to a loading floor of a vehicle and the rearward region of the planar upper surface includes an opening to the lower storage chamber;

a first and a second slide rail disposed on the planar upper surface of the support platform and extending at least partially between the rearward region and the forward region;

a moveable unit slidably coupled to the stationary unit via the first and second slide rails and configured to move between a rear position and a forward position relative to the stationary unit along a longitudinal axis extending between the forward region and the rearward region, wherein the moveable unit at least partially extends over at least a portion of the rearward region of the planar upper surface and the opening to the lower storage chamber when the moveable unit is in the rear position, and wherein the moveable unit extends over at least a portion of the forward region of the planar upper surface such that the opening to the lower storage chamber is accessible when the moveable unit is in the forward position; and a cover configured to extend across the opening to the lower storage chamber.

18. The command center storage system of claim 17, further comprising at least one hinge coupling the cover to the support platform.

19. The command center storage system of claim 17, further comprising a gasket configured to generally seal the lower storage chamber.

20. The command center storage system of claim 19, wherein the gasket is configured to generally seal the cover to the support platform.

* * * * *